US012562606B2

(12) United States Patent
Drots et al.

(10) Patent No.: US 12,562,606 B2
(45) Date of Patent: Feb. 24, 2026

(54) STATOR ASSEMBLIES AND METHODS

(71) Applicant: General Electric Renovables Espana, S.L., Barcelona (ES)

(72) Inventors: Thomas Drots, Nantes (FR); Sadeo Ramtahal, Schenectady, NY (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 292 days.

(21) Appl. No.: 17/964,282

(22) Filed: Oct. 12, 2022

(65) Prior Publication Data

US 2023/0124219 A1     Apr. 20, 2023

(30) Foreign Application Priority Data

Oct. 18, 2021     (EP) ..................................... 21382935

(51) Int. Cl.
H02K 1/14          (2006.01)
H02K 7/18          (2006.01)

(52) U.S. Cl.
CPC ............. *H02K 1/148* (2013.01); *H02K 7/183* (2013.01); *H02K 2201/15* (2013.01)

(58) Field of Classification Search
CPC ...... H02K 7/1838; H02K 1/185; H02K 7/183; H02K 5/207; H02K 1/187; H02K 1/148; H02K 9/08; H02K 1/2791; H02K 1/20; H02K 1/325; F03D 15/20
See application file for complete search history.

(56) References Cited

U.S. PATENT DOCUMENTS

| | | | |
|---|---|---|---|
| 8,179,002 B2 * | 5/2012 | Mancuso | ................. H02K 1/20 |
| | | | 310/58 |
| 9,106,109 B2 | 8/2015 | Seibicke et al. | |
| 10,819,170 B2 | 10/2020 | Messner et al. | |
| 11,289,976 B2 * | 3/2022 | Ramtahal | ................. H02K 1/16 |
| 2007/0103027 A1 | 5/2007 | Jansen et al. | |
| 2011/0210560 A1 | 9/2011 | Mancuso et al. | |
| 2012/0181792 A1 | 7/2012 | Pettersen et al. | |
| 2014/0175919 A1 * | 6/2014 | Miyamoto | ............... H02K 9/08 |
| | | | 310/59 |
| 2022/0231557 A1 | 7/2022 | Peng et al. | |

FOREIGN PATENT DOCUMENTS

| | | | | |
|---|---|---|---|---|
| EP | 3351791 A1 * | 7/2018 | ............. | F03D 15/20 |
| WO | WO2011/031165 A1 | 3/2011 | | |
| WO | WO2020238265 A1 | 12/2020 | | |
| WO | WO-2021027301 A1 * | 2/2021 | ............... | H02K 9/08 |

OTHER PUBLICATIONS

WO-2021027301-A1 machine translation Sep. 28, 2024.*
EP-3351791-A1 machine translation Sep. 28, 2024.*
European Search Report Corresponding to EP21382935 on Apr. 7, 2022.

* cited by examiner

*Primary Examiner* — Leda T Pham
(74) *Attorney, Agent, or Firm* — Dority & Manning, P.A.

(57)          ABSTRACT

The present disclosure relates to a stator assembly for an electrical machine. The stator assembly comprises a plurality of stator frames (110, 120, 130) forming a stator rim (100). The stator frames (110, 120, 130) defining ring sectors and mounted to each other to form a stator rim (100). Further, the stator frames (110, 120, 130) at least partially form an air distribution channel extending from at least one of the stator frames (110, 120, 130) into another of the stator frames (110, 120, 130). Methods (400) for assembling a stator assembly are also disclosed.

15 Claims, 5 Drawing Sheets

400

401

Providing at least two stator frames defining ring sectors

402

Coupling the stator frames together to form a stator rim

STATOR ASSEMBLIES AND METHODS

FIELD

The present disclosure relates to stator assemblies, and methods for providing a stator assembly.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

Wind turbine generators, and other electrical machines such as motors, generally comprise a rotor and a stator. The rotor rotates with respect to the stator. The rotor may be inner structure and the stator the other structure. The stator therefore may surround the rotor. Alternatively, in other configurations the arrangement may be opposite, with the rotor surrounding the stator.

Large electrical generators, as in modern wind turbines, may be permanent magnet excited generators (PMG) or electrically excited generators.

In permanent magnet generators, permanent magnets (PM) are generally arranged on the rotor, whereas winding elements, i.e., coils, are usually included in the stator. Alternatively, permanent magnets could also be arranged in the stator structure and winding elements in the rotor structure. Permanent magnet generators are generally reliable and require less maintenance than other type of generators.

On the other hand, electrically excited generators generally comprise a rotor having a plurality of pole shoes and excitation windings, i.e., coils. In use, a current is applied to the excitation coils. The applied current creates the polarity of the poles, wherein adjacent poles have a different magnetic polarity. As the rotor turns, the magnetic field from the pole shoes is applied to the windings of the stator causing a variable magnetic flux in the stator windings and producing a voltage in the stator windings. Thus, in electrically excited generators, the magnetic field to generate the electrical power is created electrically, and therefore permanent magnets are not required.

The electromagnetic components of an electrical machine, such as a motor or a generator, may be cooled to reduce energy losses associated with heat. To do so, a cooling system may be provided to cool the electromagnetic components of the rotor, i.e., permanent magnets, electrical windings. The electrical machine may comprise a cooling inlet to distribute a cooling fluid around the above-mentioned electromagnetic components. However, the internal geometry of the electric machine may hinder the flow distribution, leading to a substantially inhomogeneous cooling. This may cause some electromagnetic components to operate at different temperature than others, reducing the efficiency of the overall electrical machine.

Additionally, there is a trend to make larger wind turbines to capture more wind and convert the energy of the wind into electricity, e.g. the so-called "multi-megawatt" wind turbines. Particularly in direct drive wind turbines this can lead to generators of very large dimensions, e.g. an axial length of 3 or 4 or 5 meters or more, and having a diameter of 6 meter, 8 meter, 10 meters or more. This represents specific challenges in terms of manufacturing, assembly, transport and also cooling of such large electrical machines.

The type of electrical machines and the potential problems described herein are not limited to wind turbine generators. In fact, electrical machines of considerable dimensions, i.e., steam turbines and water turbines, may suffer from the same cooling and manufacturing problems or complications.

Consequently, the present disclosure provides methods and systems to at least partially overcome some of the aforementioned challenges.

SUMMARY

In an aspect of the present disclosure, a stator assembly for an electrical machine is provided. The stator assembly comprises a plurality of stator frames defining ring sectors. The stator frames are mounted to each other to form a stator rim. The stator rim has a circumferential side configured to carry electromagnetically active stator elements. Further, the circumferential side faces an air gap between the stator assembly and a rotor. Furthermore, the plurality of stator frames at least partially form an air distribution channel. The air distribution channel extends from at least one of the stator frames into another of the stator frames for distributing air along a circumferential direction of the stator rim.

According to this aspect, the fact that the stator assembly comprises more than one stator frame leads to a considerable reduction in weight and size per frame as compared with the complete stator rim. This allows using standard manufacturing techniques, and further allows a reduction in the complexity of transportation and logistics from manufacturing plant to wind turbine site. Further, this configuration allows to selectively replace a ring sector of the stator in case of malfunctioning and therefore it may reduce the overall maintenance costs. Additionally, the plurality of stator frames at least partially form an air distribution channel for circumferential air distribution. This promotes a more homogenous cooling and, at the same time, may allow to reduce the cooling flowrate to achieve a given overall heat exchange. Thus, less powerful cooling systems may be employed. Further, as different stator frames of the stator rim formed are in internal fluid communication the stator assembly allows a more versatile configuration with existing cooling systems, i.e. not all stator frames may require an air inlet for an effective heat exchange.

A ring sector may herein be regarded as a portion of a ring enclosed between two radii and an arc. Several ring sectors coupled together can form a complete ring. In the present disclosure the stator rim can be formed as a ring. A ring sector may herein be part of a circular sector. I.e. in embodiments wherein a stator is a central structure and a rotor radially surrounds the stator, various stator frames may form circular sectors including a ring sector for forming a rim portion of the stator.

In an additional aspect, a method for providing a stator assembly is provided. The method comprises providing at least two stator frames defining ring sectors. Each stator frame at least partially forms an air distribution channel for distributing air along a circumferential direction across the stator frames. Further, the method comprises providing at least two stator frames defining ring sectors, each stator frame at least partially forming an air distribution channel for distributing air along a circumferential direction across the stator frames, and coupling the stator frames together at radial end walls of the stator frames so as to form a stator rim, wherein the radial end walls comprise air distribution orifices.

According to this additional aspect, this method enables assembly of a stator rim by coupling stator frames together. Therefore, this method allows the manufacture of stator frames defining ring sectors to later form a stator assembly. This reduces manufacture complexity, space and transport logistics, and lifting requirements during transport and storage.

Additional objects, advantages and features of embodiments of the present disclosure will become apparent to those skilled in the art upon examination of the description, or may be learned by practice of the invention.

DETAILED DESCRIPTION OF EXAMPLES

Figure 1:
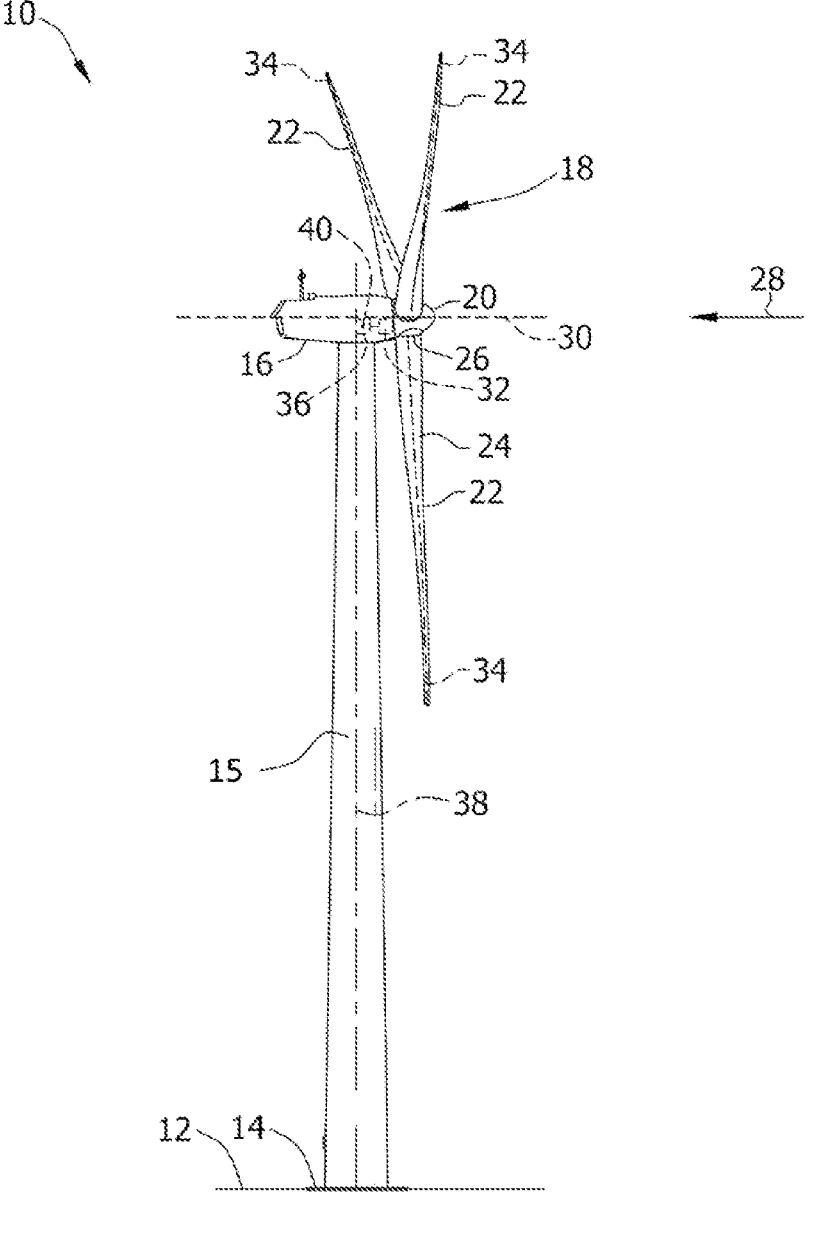
FIG. 1 schematically illustrates a perspective view of one example of a wind turbine.

Reference now will be made in detail to embodiments of the present teaching, one or more examples of which are illustrated in the drawings. Each example is provided by way of explanation of the invention, not as a limitation. In fact, it will be apparent to those skilled in the art that various modifications and variations can be made without departing from the scope or spirit of the present teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
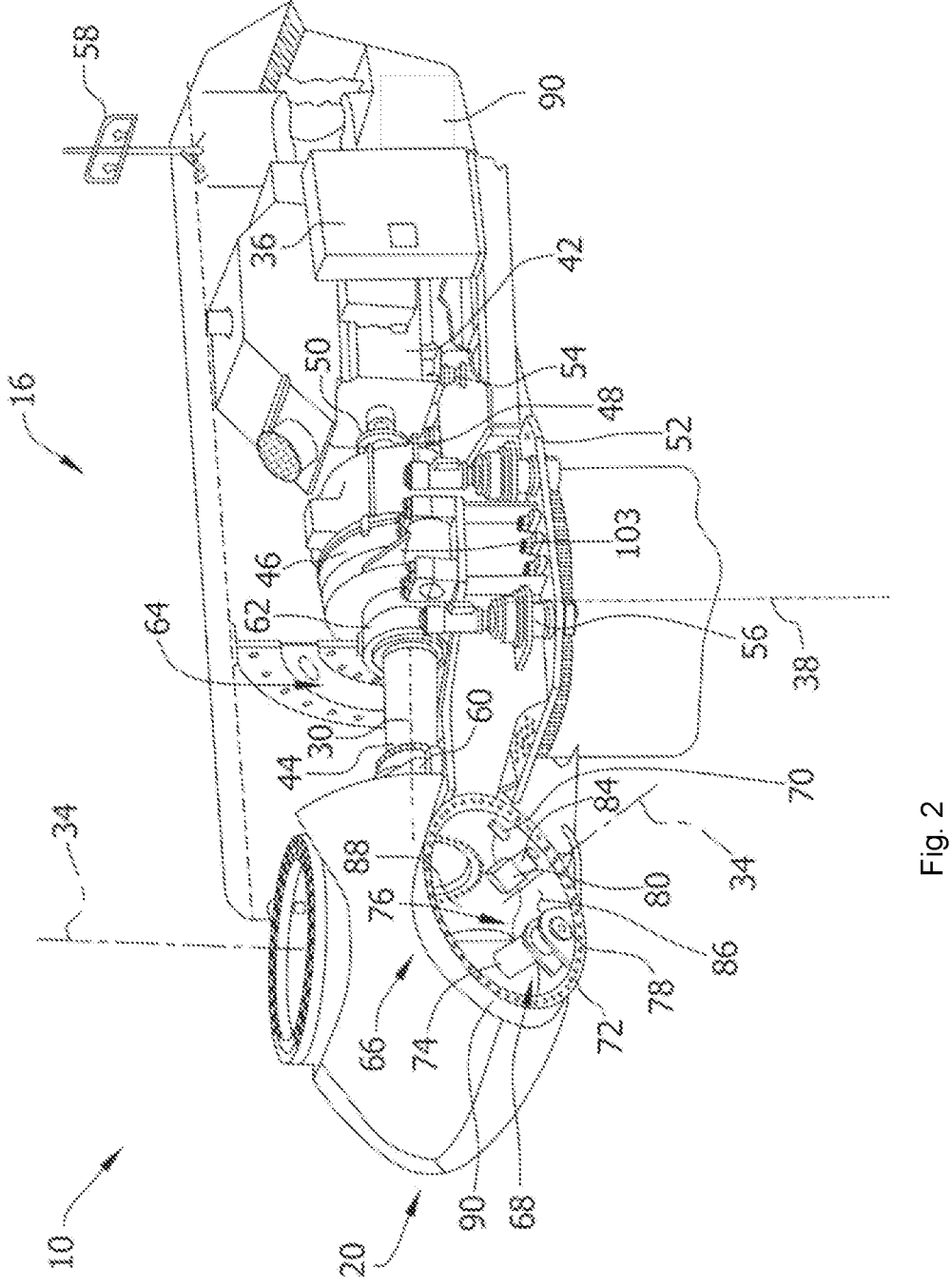
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400 V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
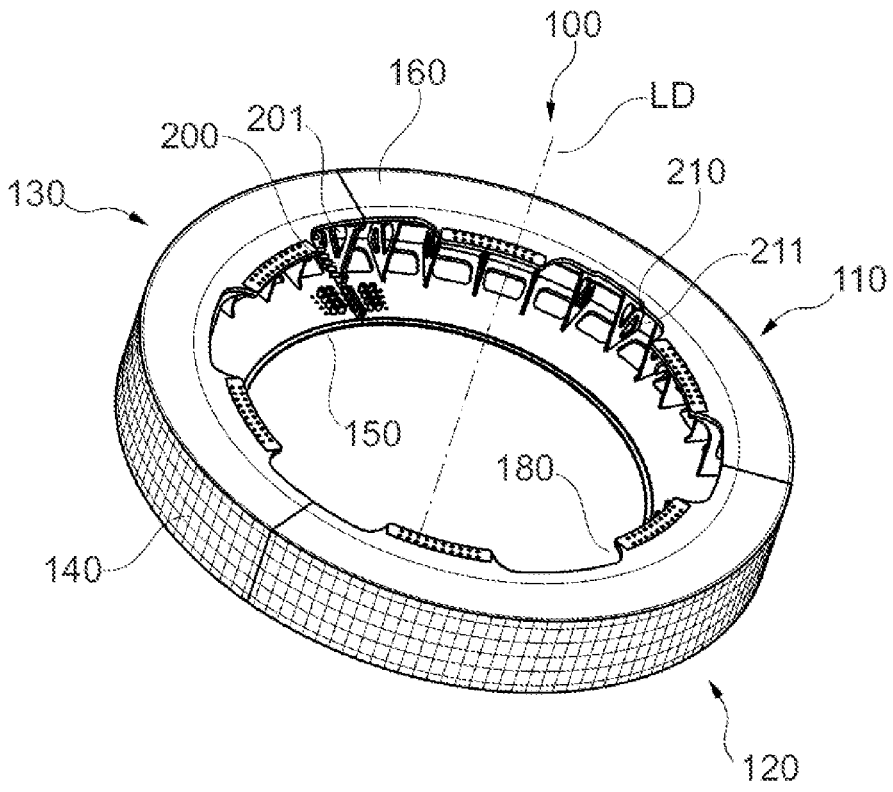
FIG. 3 schematically illustrates a perspective anterior view of an example of a stator assembly.
Figure 4:
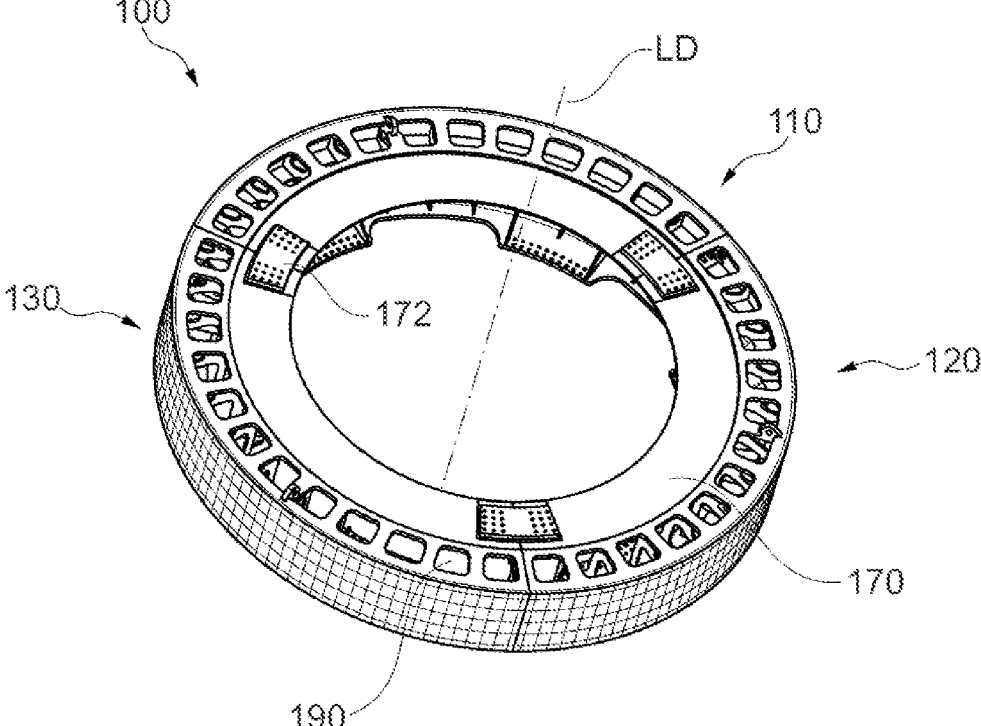
FIG. 4 schematically illustrates a perspective posterior view of the example of the stator assembly of FIG. 3.

FIGS. 3 and 4 show a perspective anterior and posterior view of an example of a stator assembly for an electric machine, respectively. In any of the following examples, the electrical machine may be a generator, and in any of the following examples, the generator may be a wind turbine generator and particularly a wind turbine generator of a direct drive wind turbine.

The stator assembly comprises a plurality of stator frames 110, 120, 130 defining ring sectors. The stator frames 110, 120, 130 are mounted to each other to form a stator rim 100. The stator rim 100 has a circumferential side 140 configured to carry electromagnetically active stator elements (not illustrated) and facing an air gap between the stator assembly and a rotor of the electric machine. The plurality of stator frames 110, 120, 130 at least partially form an air distribution channel. The air distribution channel extends from at least one of the stator frames 110, 120, 130 into another of the stator frames 110, 120, 130. Thus, the air distribution channel is configured for distributing air along a circumferential direction of the stator rim 100.

In some examples, a stator frame 110, 120, 130 may comprise radial end walls 200 delimiting the respective ring sector in a circumferential direction. The radial end walls 200 provide strength and rigidity to the stator frame 110, 120, 130. Further, the radial end walls 200 may have air distribution orifices 201 to promote tangential air distribution around the inside of the stator rim 100.

The radial end walls may be configured for mounting adjacent stator frames to each other. To this end, the radial end walls may include openings or holes for receiving fasteners such as bolts or studs, or other to connect to each other.

In some examples, the stator assembly may comprise lateral walls 160, 170 delimiting the stator rim 100 in a longitudinal direction LD. As shown in FIGS. 3 and 4, the lateral walls 160, 170 may be integrally formed with the stator frames 110, 120, 130. Alternatively, the lateral walls 160, 170 may be independent components coupled to the stator frames 110, 120, 130. The lateral walls 160, 170 at least partially close the stator rim 100 and contribute on the tangential airflow circulation inside the same.

In the example shown in FIGS. 3 and 4, the stator assembly may be arranged radially inside of a generator rotor, i.e. the generator rotor may radially surround the generator stator. As illustrated in FIGS. 3 and 4, the stator assembly may define a radially outer side 140, which comprises a radially delimiting wall, and a radially inner side 150, which does not comprise such a delimiting wall. The radially inner wall has been omitted in the present example for a better visualization of the internal elements, i.e. radial end walls 200. Such a delimiting wall may also be present in the stator assembly of the present disclosure or may be part of an independent generator structure. Herein, the terms "radially inner side" and "radially outer side" are merely used for explanatory purposes. In fact, the technical features relative to these radial sides could reverse for an electrical machine wherein the stator assembly surrounds a rotor.

Further, FIG. 3 shows that the stator frames 110, 120, 130 forming the stator rim 100 may further comprise circumferentially distributed structural elements 210. The example illustrated in FIGS. 3 and 4 shows that the structural elements 210 may be flanges that are substantially contained in a plane perpendicular to the circumferential direction. Further, the flanges may comprise air distribution orifices 211. The shape, number and the distribution of the structural elements around the stator rim 100 may vary depending on specific requirements of the stator assembly. For example, the structural elements may be beams arranged with circumferential symmetry. Alternatively, the structural elements may be arranged without circumferential symmetry to provide a dedicated free space for additional components. In other examples, the structural elements may be flanges contained in planes at an angle with respect to the circumferential direction.

Additionally, FIGS. 3 and 4 also show that the exemplary stator assembly comprises one or more openings 180 to receive air inlets (not illustrated) arranged on a first lateral wall 160 and one or more air outlets 190 arranged on a second lateral wall 170. In this example, the second lateral wall 170 may be on a driven side (i.e. the side where a wind turbine rotor for driving the generator rotor may be located) and the first lateral wall 160 may be arranged on a non-driven side.

In the present example of FIGS. 3 and 4, the openings 180 and air outlets 190 are merely illustrated as orifices in the lateral walls 160, 170. However, the openings 180, the air inlets and the air outlets 190 may comprise streamlined geometries to provide a smooth inflow and outflow transition to and from the stator assembly. Additionally, the number and distribution of openings 180 (and respective air inlets) and air outlets 190 may differ from the example illustrated. For example, a stator assembly comprising a plurality of stator frames 110, 120, 130 wherein at least one of the stator frames 110, 120 130 does not include an air inlet may also be possible. To this end, it is noted that all stator frames 110, 120, 130 do not necessarily need to be identical. Possible distributions of air inlets and air outlets 190 will be discussed in more detail in respect to FIG. 6.

FIG. 4 also shows that the second lateral wall 170 may comprise a recess area configured to receive a joining plate 172. The joining plate 172 may be used to connect the lateral walls 170 together. Thus, the lateral walls of the stator assembly may be built-up from several wall segments, leading to an improved ergonomics, and manufacturability, as well as to simplification of maintenance operations by removal of such a wall segment. The joining plate 172 may be arranged on said recessed areas and may be secured through bolts or similar fasteners to neighboring wall segments. Although not shown in FIG. 4, the space between wall segments may be sealed off to maintain a protected environment inside the generator. Silicone may be used to seal off such spaces.

Figures 5, 6:
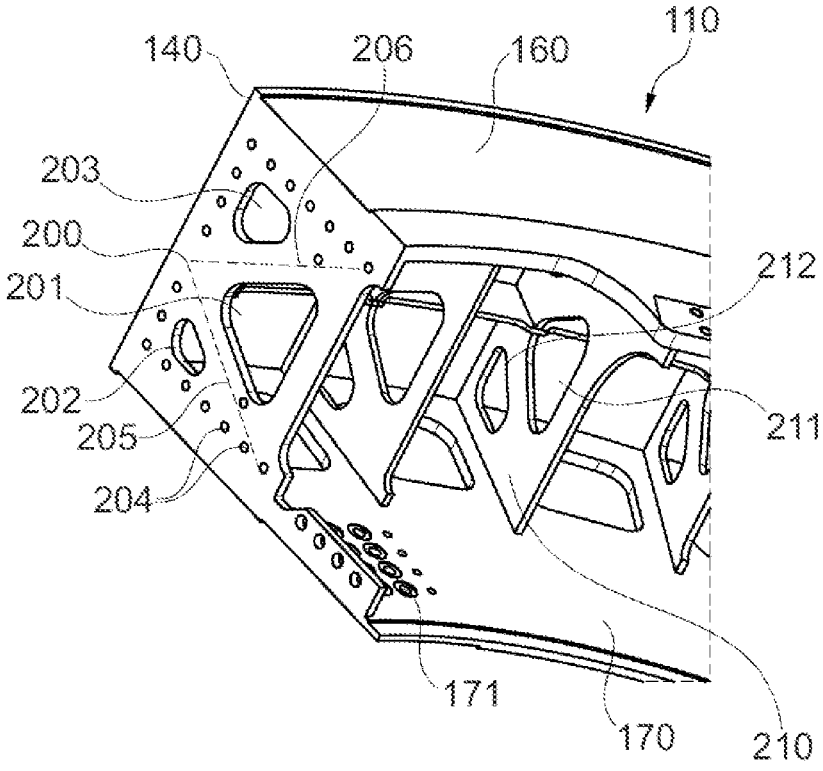
FIG. 5 schematically illustrates a detailed view of a radial end wall of one of the exemplary stator frames of FIGS. 2 and 3.
FIG. 6 schematically illustrates a detailed cross-section view across a generator assembly comprising a stator assembly according to the example shown in FIGS. 3-5.

FIG. 5 is a detailed view of an example of a radial end wall 200 of an exemplary stator frame. As shown in FIG. 5, the radial end wall 200 may comprise a plurality of air distribution orifices 201, 202, 203. Further, FIG. 5 also illustrates that the air distribution orifices 211, 212 of the flange 210 may be substantially aligned with the air distribution orifices 201, 202 of the radial end wall 200 along a circumferential direction. Further, FIG. 5 also shows that the air distribution orifices that are aligned, i.e. 201-211, 202-212, may have a similar shape and size. Accordingly, this distribution of orifices leaves a circumferential path free of obstacles and obstructions that promotes the air to flow along the circumferential direction. In other examples, the structural elements could be beams arranged so that to leave the aforementioned circumferential path free of obstructions, or at least substantially free of obstructions.

Additionally, FIG. 5 shows that the radial end walls 200 may define two structural load paths 205, 206. Herein, the structural load paths have been illustrated with a broken line, but these should be understood as the path that a load acting on the circumferential side 140 (here the radially outer side) could follow along the radial end wall 200 to the radially inner side 150, and vice versa. In the present example, the load paths 205, 206 connect the circumferential side 140 to the radially inner 150 side following a substantially straight path along a radial end wall 200. As will be discussed in respect to FIG. 6, analogous load paths may also form on flanges 210.

The example illustrated in FIG. 5 also shows that the two structural load paths 205, 206 may form an angle of between 40 and 70 degrees between each other, specifically between 50 and 60 degrees. This range of angles allows to efficiently spread the loads into different components, increasing the strength capabilities of the stator assembly. Load paths 205, 206 are formed in a continuous material in a substantially straight direction. Thus, load paths 205, 206 may have orifices 201, 202, 203 on the sides, at least partially delimiting the same.

Further, the plurality of air distribution orifices 201, 202, 203 of the radial end walls 200 may comprise main orifices 201 of substantially triangular shape. The main orifices 201 may have an edge substantially parallel to the radially outer side 140 of the stator rim 100 and two other edges parallel to the two load path directions 205, 206. Besides, the substantially triangular main orifices 201 may comprise rounded corners to reduce local stresses that could potentially affect the integrity of the radial end wall 200. More specifically, the radius of curvature of the rounded corners of the main orifices 201 is between 10% and 35% of a height of the main orifice, specifically between 15% and 30% of the height of the main orifice.

In addition, the plurality of air distribution orifices may also comprise secondary orifices 202, 203 having a substantially straight edge parallel to one of the load path directions 205, 206. Particularly, the secondary orifices 202, 203 may have a substantially triangular shape and may comprise rounded corners, also to mitigate local stresses. The radius of curvature of the rounded corners of the triangular secondary orifices 202, 203 may be between 30% and 60% of a height of the secondary orifice. The secondary orifices 202, 203 may be smaller than the main orifices 201.

As previously disclosed, the technical features relative the radial end wall 200 of the stator frame 110, 120, 130 may also be included in a stator rim 100 or may be part of separated component(s) coupled to the stator frame 110, 120, 130 or stator rim 100.

The example illustrated in FIG. 5 also shows that the radial end wall 200 may further comprise receptacles 204 to receive fasteners. Additionally, the stator assembly may further comprise fasteners. The fastener may couple stator frames 110, 120, 130 together. The receptacles 204 may be arranged around a periphery of the radial end wall 200. In some examples, the receptacles 204 may be through holes, whereas in other examples the receptacles 204 may be blind threaded holes. In other examples, the receptacles 204 may be a combination of through holes and blind threaded holes. Further, a lateral wall (in this example the second lateral wall 170) may also comprise additional receptacles 171 to connect a joining plate 172 (illustrated in FIG. 4) between lateral wall segments.

FIG. 6 is a detailed cross-section view of a wind turbine generator. In the illustrated example, the wind turbine generator 42 comprises a rotor 300 and a stator assembly according to the present disclosure. FIG. 6 illustrates an exemplary cooling airflow path, wherein broken arrows represent relatively cold air and solid arrows represent relatively warm air. As illustrated, cooling air may be provided to the stator assembly through an air inlet 188. Once the air is inside the stator assembly, the air distribution orifices 201, 202, 203 in the radial end walls 200 (not illustrated here) and the air distribution orifices 211, 212, 213 in the flanges 210 allow the cooling air to travel circumferentially along the air distribution channel and around the stator assembly before exiting the stator assembly through an air outlet 190. Then, the airflow travels around the stator assembly and between the rotor 300 and the stator rim 100 of the stator assembly before being collected by an air outlet. More specifically, the airflow travels along the air gap between active rotor parts 301 and active stator parts 141. The active parts of the stator and rotor may be permanent magnets, coils, windings and combinations thereof. Thus, the air distribution channel enables an efficient cooling around the stator rim 100 to compensate having a limited number and even non-homogeneous distribution of air inlets 188 and air outlets 190. This allows to arrange air inlets 188 and air outlets 190 in multiple configurations, i.e. symmetrical and non-symmetrical configurations, due to space limitations or other operational requirements.

In another aspect of the present disclosure, a stator assembly for an electric machine is disclosed. The stator assembly comprises a plurality of ring sectors 110, 120, 130 mounted to each other to form a stator rim 100. Further, the ring sectors 110, 120, 130 comprise a sector of the stator rim 100 having a circumferential side configured to carry electromagnetically active stator elements and facing an air gap with a rotor. Besides, the stator rim 100 has a first lateral wall 160 at a first axial side of the electrical machine and a second lateral wall 170 at a second axial side. Further, the stator rim 100 has a first radial end wall 200 at a first circumferential end of the ring sector, and a second radial end wall at a second circumferential end of the ring sector 110, 120, 130. Additionally, the first and second radial end wall 200 comprise one or more air distribution orifices 211, 212, 213. Thus, the stator assembly defines an air distribution pathway that promotes tangential air distribution inside and around the stator assembly.

Further, the air distribution orifices may be aligned and may have similar shape and size. More specifically, FIG. 6 shows that the orifices 211, 212, 213 in the flange 210 may be substantially replicated in the subsequent flanges. Additionally, FIG. 6 also illustrates that the air distribution orifices 211, 212, 213 (in the flanges 200 and in the radial end walls 200) substantially define two structural load paths 205, 206 from a radially outer side 140 to an inner side 150 of the circumferential rim 100.

Figure 7:
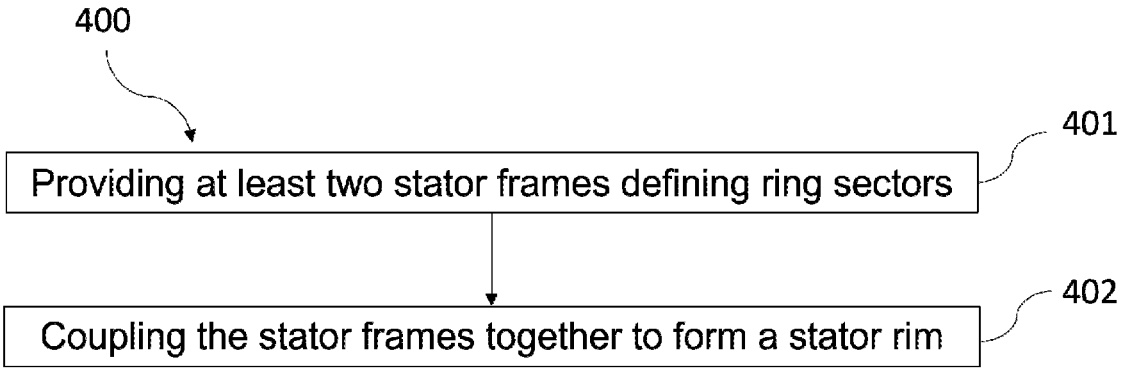
FIG. 7 illustrates a flowchart of an example of a method for providing a stator assembly.

In another aspect of the disclosure, a method 400 is provided. Method 400 is suitable for assembling a stator assembly. Method 400 is schematically illustrated in FIG. 7.

The method comprises, at block 401, providing at least two stator frames 110, 120, 130. Each stator frame 110, 120, 130 defines a ring sector and at least partially forms an air distribution channel for distribution air along a circumferential direction across the stator frames 110, 120, 130. Further, the method 400 comprises, at block 402, coupling the stator frames 110, 120, 130 together so that to form a circumferential rim.

In this regard, the stator frames 110, 120, 130 may define ring sectors with different arc angles, i.e. a first stator frame may define a ring sector with an arc angle of 90 degrees and a second stator frame may define a ring sector with an arc angle of 270 degrees, a first stator frame may define a ring sector with an arc angle of 180 degrees and a second stator frame may define a ring sector with an arc angle of 180 degrees, or other combinations.

According to this aspect, the method allows assembling a stator circumferential rim 100 formed by a plurality of independent stator frames 110, 120, 130. Said independence of stator frames 110, 120, 130 reduces the overall manufacturing complexity of the stator rim 100. Further, it also simplifies the logistics related to storage and transport of the same, and at the same time reduces the lifting requirements of associated equipment during transport operations.

In examples, the stator frames 110, 120, 130 provided in block 401 further comprise radial end walls 200 delimiting the stator frame 110, 120, 130 in a circumferential direction and a flange 210 between the radial end walls 200. The radial end walls 200 and the flange 210 may comprise air distribution orifices 211, 212, 213 circumferentially aligned. Additionally, the coupling step in block 402 may be performed by inserting fasteners on receptacles 204 located on the radial end walls 200. Besides, the coupling can also be performed using connection plates 172 between stator frames 110, 120, 130. These additional steps of the method 400 allow to secure the stator assembly providing a secure and easy to access coupling before operating the electric machine.

Any technical feature described in respect to the stator assembly or any of its components may be also included in method 400 for assembling a stator assembly.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A stator assembly for an electrical machine, wherein the electrical machine includes a stator and a rotor having an axis of rotation along a longitudinal direction (LD) and a radial air gap between the stator and the rotor, the stator assembly comprising:

a plurality of stator frames defining a plurality of ring sectors, the stator frames mounted to each other to form a stator rim having a circumferential side facing the radial air gap and configured to carry electromagnetically active stator elements, the plurality of stator frames at least partially forming an air distribution channel, and wherein the air distribution channel extends from at least one of the stator frames into another of the stator frames for distributing air along a circumferential direction of the stator rim, wherein cooling air from outside the stator assembly is provided to the stator assembly through an air inlet, and, once inside the stator assembly, at least a portion of the cooling air travels circumferentially along the air distribution channel through one or more air distribution orifices in radial end walls of the stator frames before exiting the stator assembly through an air outlet, and wherein, after exiting the stator assembly through the air outlet, the at least the portion of the cooling air then travels along the radial air gap between active rotor parts and active stator parts.

2. The stator assembly according to claim 1, wherein the radial end walls delimit a respective ring sector of the plurality of ring sectors in a circumferential direction.

3. The stator assembly according to claim 2, wherein the stator frames are configured to be coupled together at the radial end walls.

4. The stator assembly according to claim 2, wherein the radial end walls define two structural load paths from a radially outer side to a radially inner side of the stator frame, the structural load paths being substantially straight.

5. The stator assembly according to claim 4, wherein the two structural load paths form an angle of between 40 and 70 degrees between each other.

6. The stator assembly according to claim 1, wherein the air distribution orifices comprise main orifices of substantially triangular shape with rounded corners, wherein the triangular shape comprises a triangular edge substantially parallel to the radially outer side of the stator frame and two other edges substantially parallel to the two load path directions.

7. The stator assembly according to claim 6, wherein a radius of curvature of the rounded corners of the main orifices is between 10% and 35% of a height of the main orifice.

8. The stator assembly according to claim 6, wherein the air distribution orifices comprise one or more secondary orifices that are smaller than the main orifice.

9. The stator assembly according to claim 8, wherein the secondary orifices are of substantially triangular shape and have a substantially straight edge parallel to one of the load path directions.

10. The stator assembly according to claim 1, further comprising lateral walls separated from each other along the longitudinal direction and delimiting the stator rim in the longitudinal direction.

11. The stator assembly according to claim 10, wherein the lateral walls are integrally formed with the stator frames.

12. The stator assembly according to claim 10, further comprising air inlets defined in the lateral walls.

13. A generator, comprising the stator assembly according to claim 1.

14. A direct drive wind turbine, comprising a generator that includes the stator assembly according to claim 1.

15. A method for assembling a stator assembly, the method comprising:

providing at least two stator frames defining respective ring sectors, each stator frame at least partially forming an air distribution channel for distributing air along a circumferential direction across the stator frames; and coupling the stator frames together at radial end walls of the stator frames so as to form a stator rim, wherein the radial end walls comprise air distribution orifices, wherein air flow travels along an air gap between active rotor parts and active stator parts, and wherein cooling air from outside the stator assembly is provided to the stator assembly through an air inlet, and, once inside the stator assembly, at least a portion of the cooling air travels circumferentially along the air distribution channel through one or more air distribution orifices in radial end walls of the stator frames before exiting the stator assembly through an air outlet, and wherein, after exiting the stator assembly through the air outlet, the at least the portion of the cooling air then travels along the radial air gap between active rotor parts and active stator parts.

* * * * *